United States Patent
Pearson et al.

(10) Patent No.: US 6,647,424 B1
(45) Date of Patent: Nov. 11, 2003

(54) METHOD AND APPARATUS FOR DISCARDING DATA PACKETS

(75) Inventors: Terry Pearson, Hollis, NH (US); Tom Colley, Boxborough, MA (US); Larry Manor, Londonderry, NH (US); Joe Kidder, Arlington, MA (US); Linda Cabeca, Waltham, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/314,563

(22) Filed: May 19, 1999

Related U.S. Application Data

(60) Provisional application No. 60/086,078, filed on May 20, 1998.

(51) Int. Cl.[7] .............................................. G06F 15/16
(52) U.S. Cl. ...................................... 709/232; 370/235
(58) Field of Search ................................. 370/397, 412, 370/235, 236, 321, 229, 419, 337; 709/232, 235

(56) References Cited

U.S. PATENT DOCUMENTS

| | | | | | |
|---|---|---|---|---|---|
| 5,313,455 | A | * | 5/1994 | van der Wal et al. | 370/232 |
| 5,463,620 | A | * | 10/1995 | Sriram | 370/229 |
| 5,781,532 | A | * | 7/1998 | Watt | 370/236 |
| 6,104,700 | A | * | 8/2000 | Haddock et al. | 370/235 |
| 6,167,027 | A | * | 12/2000 | Aubert et al. | 370/230 |
| 6,188,698 | B1 | * | 2/2001 | Galand et al. | 370/412 |
| 6,222,844 | B1 | * | 4/2001 | Han et al. | 370/397 |
| 6,381,649 | B1 | * | 4/2002 | Carlson | 370/230 |

* cited by examiner

*Primary Examiner*—Glenton B. Burgess
*Assistant Examiner*—Kimberly Flynn
(74) *Attorney, Agent, or Firm*—Blakely Sokoloff Taylor & Zafman LLP

(57) ABSTRACT

A method, apparatus and article of manufacture for filtering a data packet. The data packet is classified a filter type according to a classification criteria. A size value of the data packet is added to a data count for the filter type. The filter type is compared to a committed information rate (CIR). The data packet is filtered if the data count exceeds the CIR or a burst rate. A status the data packet may optionally be altered if the data count exceeds the CIR. A priority of the data packet may optionally be reclassified if the data count exceeds the CIR.

19 Claims, 8 Drawing Sheets

METHOD AND APPARATUS FOR DISCARDING DATA PACKETS

CROSS-REFERENCES TO RELATED APPLICATIONS

This application claims the benefit of U.S. Provisional Application No. 60/086,078 entitled "Big Access Concentrator" filed May 20, 1998.

FIELD OF THE INVENTION

This invention relates generally to computer networks, and more particularly, to a method and apparatus for quality of service (QOS) capable filtering.

BACKGROUND OF THE INVENTION

In the field of data routing in computer networks, an Internet service provider (ISP) user typically has much more stringent requirements than an enterprise user because the routers will be subjected to the adverse Internet routing environment in the world. There are three typical architectural requirements that such routers must support, described below.

A. Stable Operation

Although it sounds trivial, the notion of stable operation has been elusive in the ISP community, as witnessed by various Internet "brown-outs" since its inception. One paper on Internet scaling "Scaling the Internet during the T3 NSFNET Years", C. Villamizar, Oct. 22, 1997, articulates the basic requirements which ISPs demand from their networking equipment in order to provide a stable network. In addition to forwarding performance and scaling requirements, ISPs typically expect several operational attributes, given below.

1. Stability under adverse conditions. The router must remain stable and deterministic under arbitrarily high traffic loads or a flood of routing update changes.
2. Low packet loss to stable destinations. The effects of unstable routes (flapping) should not impact a router's ability to forward traffic to stable routes.
3. Reasonable fairness and congestion control. Sufficient buffering capacity, avoidance of head-of-line blocking, advanced queuing algorithms, and sophisticated discard techniques must be provided.

B. Service Differentiation

Recently it has become clear that service providers cannot make adequate margins by offering flat-rate access and undifferentiated service. The ability to offer tiered services, and to guarantee service levels, is crucial to the economic and competitive health of ISPs. The airline industry's first-class, business-class and coach-class offerings provide a meaningful analogy for Internet service differentiation: a small number of customers are willing to pay for premium service, if it can be guaranteed. The concentrator's must enable ISPs to offer differentiated services based on multiple queues and advanced, intelligent Traffic Management features.

C. Superior Reliability

ISP routers must provide a greater level of reliability and availability than known router architectures. Part of this flows from designing with stability in mind, but providing additional fault tolerance features adds another dimension of resiliency. ISP routers should be designed without any single points of failure, and all software designs should incorporate fault isolation principles.

Therefore, there is a need for a way to route data in computer networks that provides stable operation, service differentiation, and superior reliability. Such an invention should be stable under adverse conditions, insure low packet loss to stable destinations, and provide reasonable fairness and congestion control.

SUMMARY OF THE INVENTION

The present invention provides a method, apparatus and article of manufacture for filtering a data packet. The data packet is classified a filter type according to a classification criteria. A size value of the data packet is added to a data count for the filter type. The filter type is compared to a committed information rate (CIR). The data packet is filtered if the data count exceeds the CIR or a burst rate. A status the data packet may optionally be altered if the data count exceeds the CIR. A priority of the data packet may optionally be reclassified if the data count exceeds the CIR.

BRIEF DESCRIPTION OF THE DRAWINGS

The disclosed technology is illustrated by way of example and may be better understood by referring to the following description in conjunction with the accompanying drawings, in which like references indicate similar elements and in which.

DETAILED DESCRIPTION OF AN EMBODIMENT OF THE PRESENT INVENTION

In the following description of an embodiment, reference is made to the accompanying drawings which form a part hereof, and in which is shown by way of illustration a specific embodiment in which the disclosed technology may be practiced. It is to be understood that other embodiments may be utilized and structural changes may be made without departing from the scope of the disclosed technology. An embodiment of the disclosed technology, described below, enables a remote computer system user to execute a software application on a network file server.

The present invention provides a method, apparatus and article of manufacture for filtering a data packet. The data packet is classified a filter type according to a classification criteria. A size value of the data packet is added to a data count for the filter type. The filter type is compared to a CIR. The data packet is filtered if the data count exceeds the CIR or a burst rate. A status the data packet may optionally be altered if the data count exceeds the CIR. A priority of the data packet may optionally be reclassified if the data count exceeds the CIR.

Hardware Environment

Figure 1:
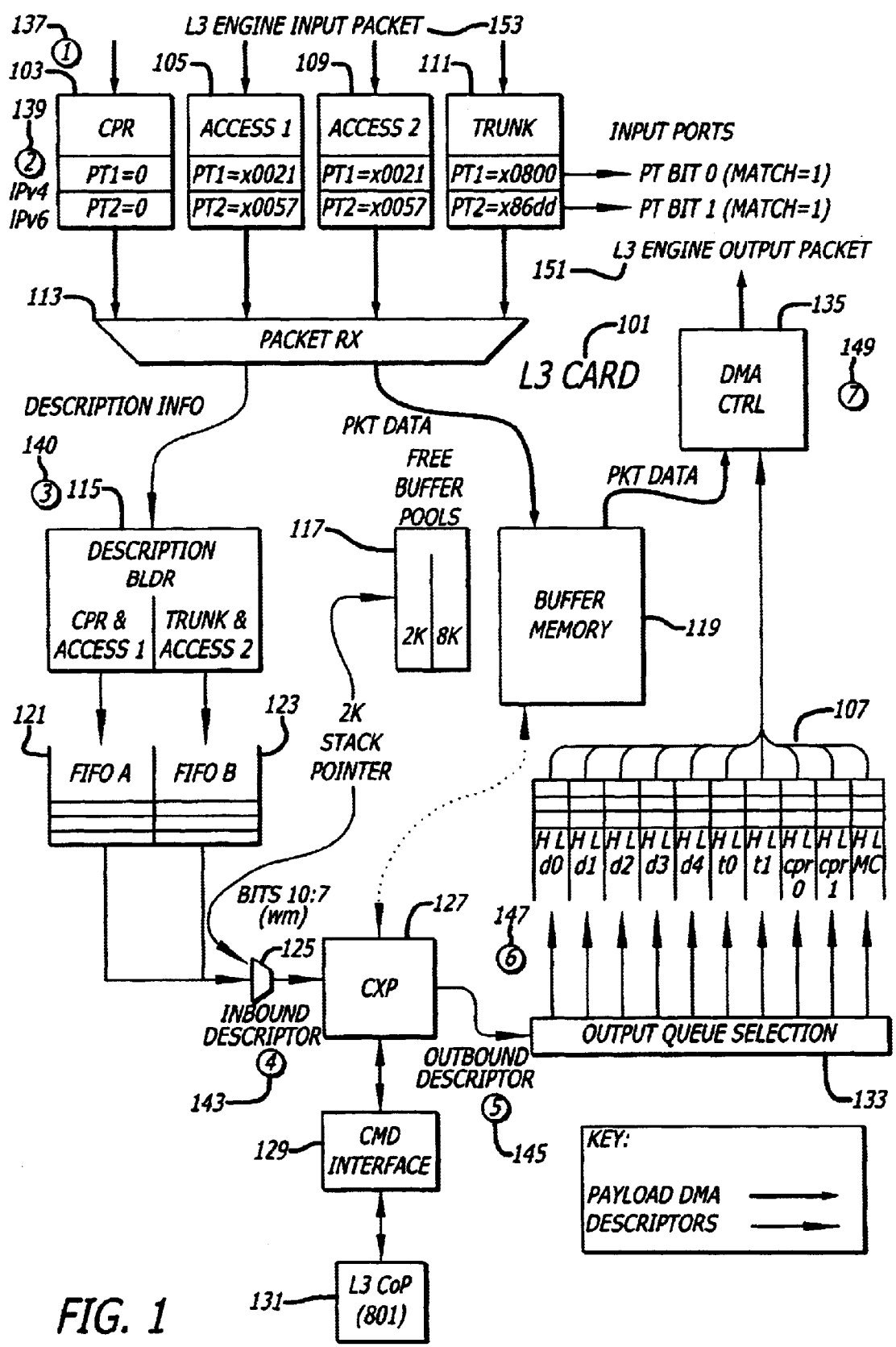
FIG. 1 shows a block diagram of an L3 card forwarding path compatible with the present invention.

FIG. 1 illustrates a data path of a packet through a hardware environment compatible with the disclosed technology. At step 137, packets 153 enter the L3 card 101 from the access cards 105, 109, trunk card 111, and central process and resource (CPR) 103 cards. At step 139, inbound descriptor information is obtained from the received packet 113 as it is transferred into buffer memory 119 having a free buffer pool 117. The packet type field is compared with PT1 and PT2 type registers, with the PT bits set according. At step 141, an inbound descriptor 115 is built by combining the CPR 103 and trunk card 111 information. In one embodiment, a channel identifier, control information, and a data packet length is passed directly to the inbound descriptor 115. The CPR 103 descriptor information is forwarded to a FIFO A memory 121 and the trunk card 111 information is forwarded to a FIFO B memory 123. At step 143, the inbound descriptor 125 is read by a route switch processor (CXP) 127 and processed with the help of a command interface 129 and a L3 coprocessor 131. At step 145, an outbound descriptor is written by the CXP 127 to an output queue selector 133. At step 147, the descriptor is directed to the appropriate outbound queue 107. At step 149, the outbound descriptor is used to direct packet re-generation from a DMA controller 135 to a destination 151, and free a buffer in buffer memory 119 back to the free buffer pool 117.

To summarize, the CXP 127 reads an inbound descriptor 125, determines the packet's destination via IP Protocol destination address lookup, builds the packet outbound descriptor for packet transmission, and writes the outbound descriptor to the appropriate channel outbound queue 133 for transmission from a DMA controller 135 to a destination 151.

Buffer Memory

Figure 2:
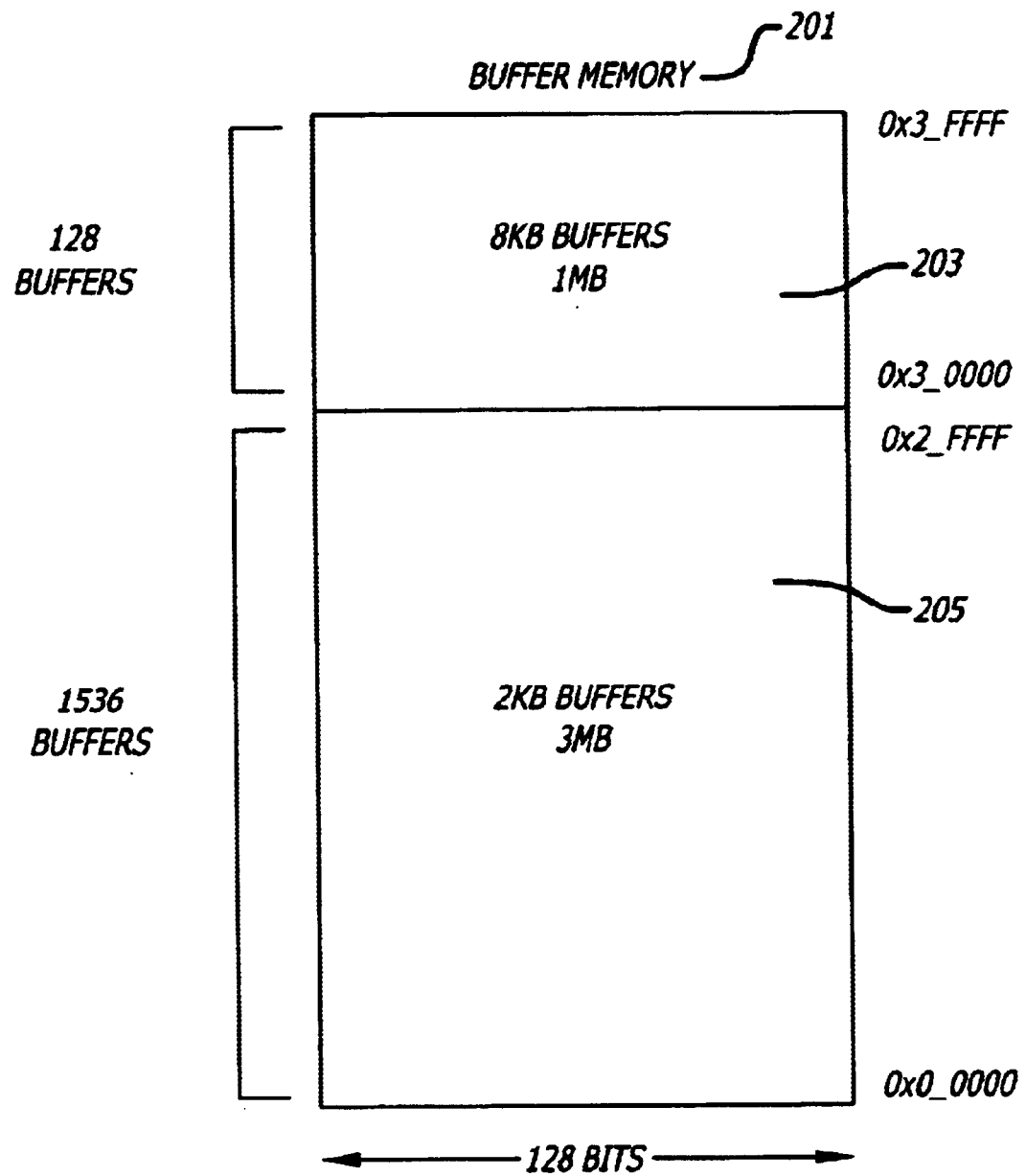
FIG. 2 shows a buffer pool division compatible with the present invention.

Incoming packets 153 are transferred directly from the access cards 105, 109, trunk card 111, and CPR 103 cards into the L3P buffer memory 119. An example structure of a typical 4 MB buffer memory 119, 201 is shown in FIG. 2, where one MB of memory is divided in to 8 KB buffers 203, and 3 MB of memory is divided into 2 KB buffers 205. A data packet is allocated to a buffer from the 2K or 8K buffer pool as indicated by the length received in the first word of the data packet. Any packet longer than 1536 bytes will be allocated an 8K byte buffer. If the system is unable to allocate a buffer from the appropriate free buffer pool, the incoming packet is dropped indiscriminately prior to any attempt for proper QOS classification. Therefore, in order to ensure proper QOS operation, packet discard at this point should be avoided.

The 4 MB buffer memory 119, 201, is preferably divided into one or two pools of fixed size buffers, as described above. Two supported sizes are 2 KBytes and 8 Kbytes, but it will be recognized by one of ordinary skill in the art that other buffer sizes may be used without loss of generality. The division between these two pools is under software control. For example, the entire 4 MB can be allocated to all 2 KB buffers and vice versa, or different portions can be allocated to each pool.

The pointers to the buffers in the 2 KB pool and 8 KB pool are maintained in two separate stack memories. Each stack memory can hold up to 8K-1 (or 8191) buffer pointers and typically has a 13-bit stack pointer. The stack pointer always points to the top of the stack. When the Stack Pointer points to the location 0, it indicates that the buffer pool is empty. The content of the stack pointer always represents the number of available buffers in that pool.

To put a buffer pointer on the stack, the stack pointer is advanced by one and then a new buffer pointer is written. To pop a buffer pointer from the stack, the buffer pointer on top of the stack is read and then the stack pointer is subtracted by one.

Watermark Generation

In one embodiment of the disclosed technology, bits 9, 8, and 7 of the 2 KB Stack Pointer are used as watermark indicator. These bits provide eight priority buckets as shown in Table 1 below.

TABLE 1

Buffer Pool Watermark.

| Watermark | Number of Buffers |
|---|---|
| 0 0 0 | 0 to 127 |
| 0 0 1 | 128 to 255 |
| 0 1 0 | 256 to 383 |
| 0 1 1 | 384 to 511 |
| 1 0 0 | 512 to 639 |
| 1 0 1 | 640 to 767 |
| 1 1 0 | 768 to 895 |
| 1 1 1 | >895 |

To ensure accurate and timely buffer pool level indication, the watermark bits at the time of the CXP 127 inbound descriptor 125 read are fed into the inbound descriptor 125. The CXP 127 uses these bits to drop packets by freeing up buffers during periods of congestion.

Figure 3:
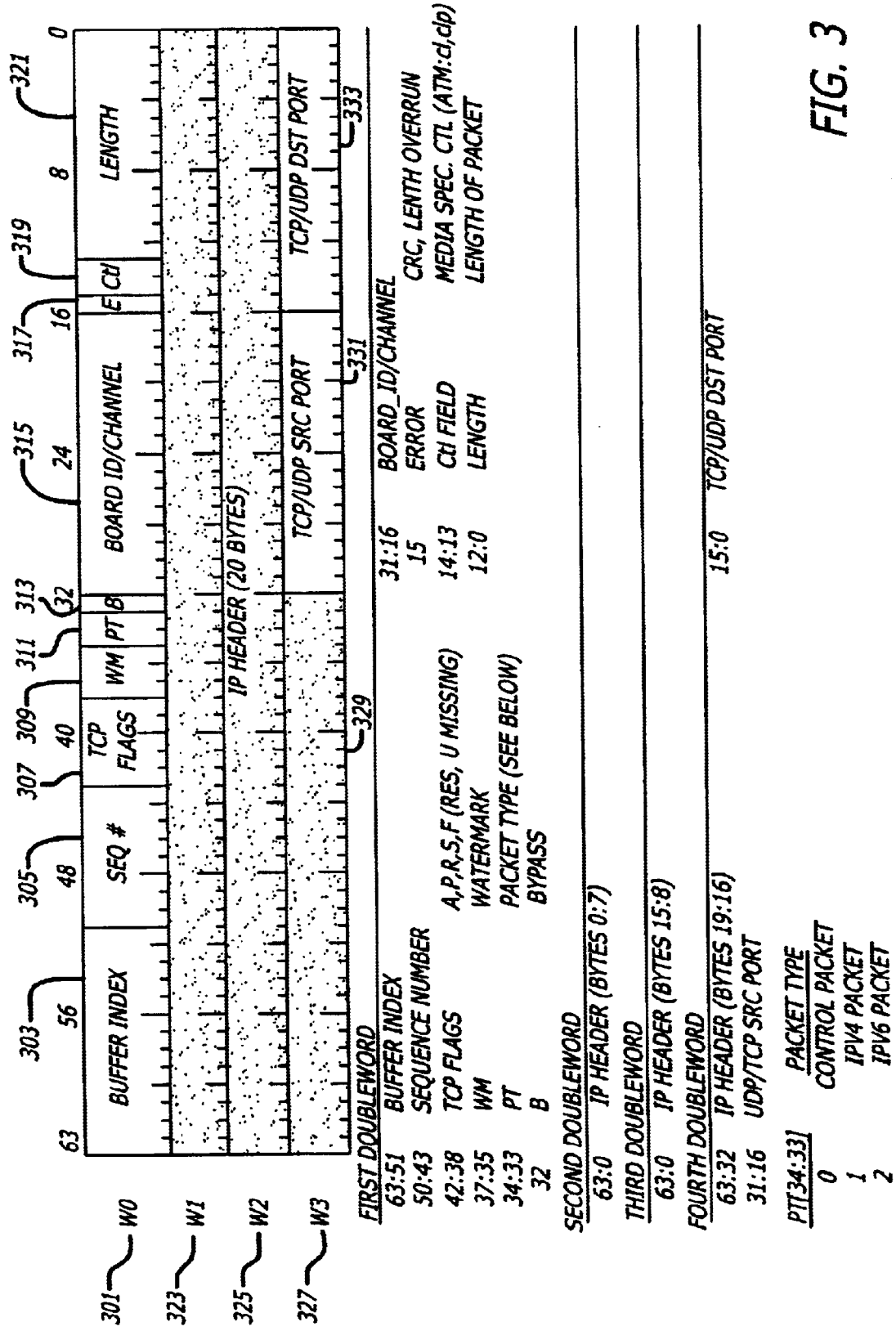
FIG. 3 shows an inbound descriptor format compatible with the present invention.

In FIG. 3, an embodiment of the first four words of an inbound descriptor is shown. Word 301 contains a buffer index 303, a sequence number 305, TCP flags 307, a watermark indicator 309, a packet type 311, a bypass indicator 313, a board ID/channel field 315, an error field 317, a control field 319, and a packet length field 321. Words 323, 325, and 327 contain the 20 byte IP header 329. Word 327 also contains a TCP/UDP source port field 331, and a TCP/UDP destination port field 333.

The format and meaning of the watermark indicator 309 is given in Table 1 above. The watermark indicator 309 is used in conjunction with an internal service class (ISC) and a drop preference bit (DP) to determine when to drop a packet, as shown in Table 2 below.

TABLE 2

Congestion Clip Table.

| ISC | DP | Watermark (WM) |
|---|---|---|
| 7 | 0 | 7, 6, 5, 4, 3, 2, 1 |
| 7 | 1 | 7, 6, 5, 4, 3 |
| 6 | 9 | 7, 6, 5, 4, 3, 2 |
| 6 | 1 | 7, 6, 5, 4 |
| 5 | 0 | 7, 6, 5, 4, 3 |
| 5 | 1 | 7, 6, 5 |
| 4 | 0 | 7, 6, 5, 4 |
| 4 | 1 | 7, 6 |
| 3 | 0 | 7, 6, 5 |
| 3 | 1 | 7 |
| 2 | 0 | 7, 6 |
| 2 | 1 | 7 |
| 1 | 0 | 7, 6 |
| 1 | 1 | 7 |
| 0 | 0 | 7 |
| 0 | 1 | 7 |

The disclosed technology tags an inbound descriptor 125 with the three bit watermark indicator 309 as they are read by the CXP 127. The three watermark bits of the watermark indicator 309 indicate the current congestion level of the buffer memory 119 and free buffer pool 117. As various thresholds are crossed, the drain rate for the input FIFO A memory 121 and FIFO B memory 123 is increased by discarding lower priority data packets.

QOS Classification/Policing

In one embodiment of the disclosed technology, classification and policing are accomplished either form a type of service (TOS) Octet in the IP header 329, or explicitly as determined by filtering in specific packet attributes configured by the user. The result of the classification is a 3 bit (8 level) ISC and a drop preference bit (DP). This 4 bit value is used exclusively within the disclosed technology to make QOS related determinations.

Figure 4:
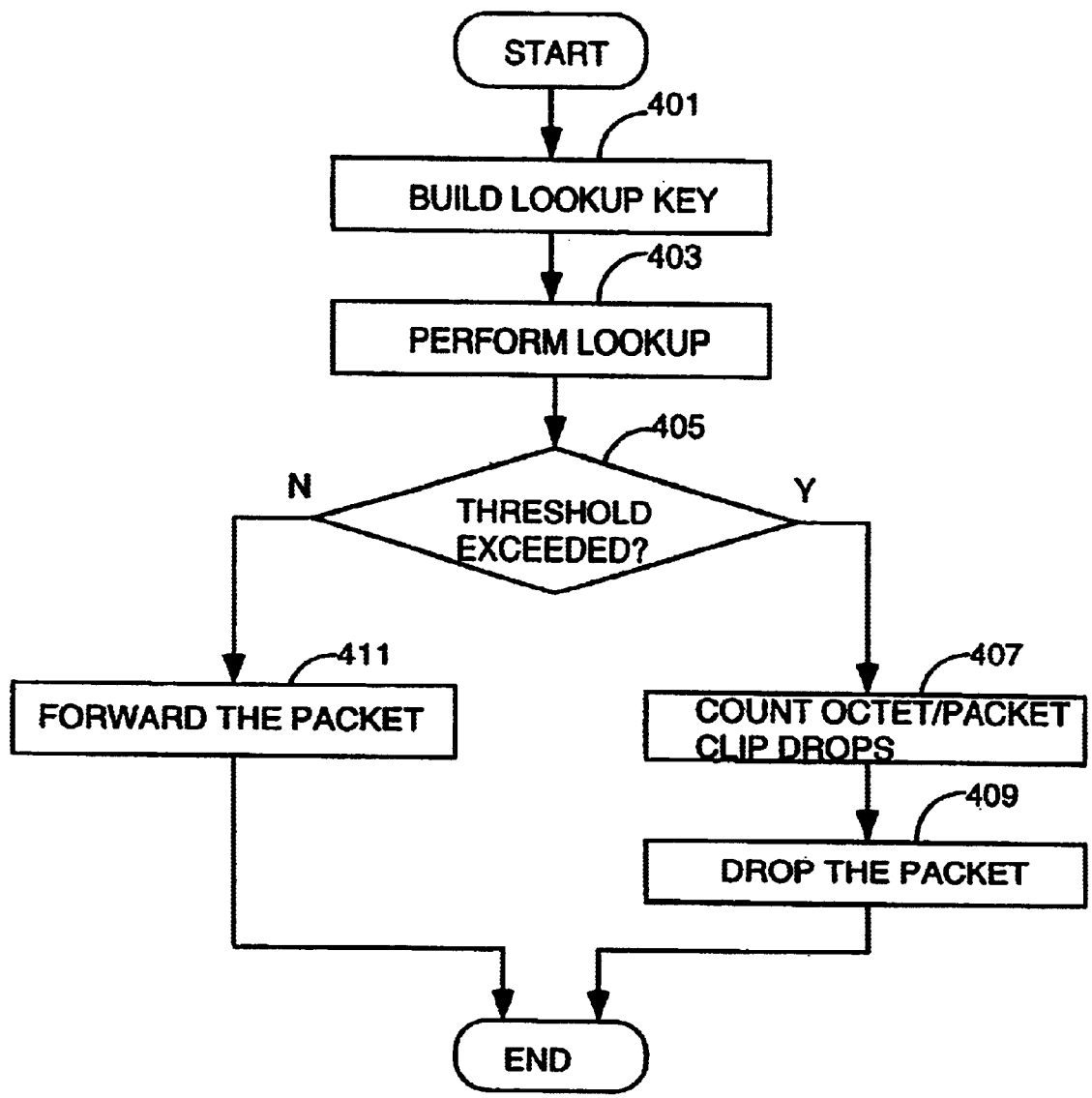
FIG. 4 shows a flow diagram of a method for discarding and forwarding data packets compatible with the present invention.

The policing. algorithm shown in FIG. 4 uses user programmable parameters to determine if the traffic rate being received has exceeded the rate of the traffic contract. In certain situations it is desirable to re-classify packets as determined from their traffic utilizations. In these cases the ISC/DP values may be modified during policing operations. At step 401, a lookup key is built using the ISC, DP and watermark values. At 403, a lookup is performed. If at step 405, a threshold is exceeded, at step 407 the number of octet/packet clip drops is counted, and the packet is dropped at step 409. Otherwise, at step 411 the packet is forwarded to the packet destination.

QOS Congestion Management

In order to differentiate between contracted service levels there should be traffic management mechanisms in place to ensure that higher precedence traffic has a better chance of making it through the concentrator than best effort traffic, especially in the case of system congestion. This system congestion is indicated by low resources in the free buffer pool 117. It is desirable to ensure 'premium' class traffic over 'best effort'.

In order to make an intelligent choice on which packets to discard and which to keep, at least three parameters are evaluated: 1) the severity of the resource shortage, indicated by watermark bits 309 in the inbound descriptor 125, 2) the ISC of the packet, and 3) the DP indication, a traffic rate exceeding its CIR may be subject for quick discard. The CXP 127 performs this evaluation by concatenating the ISC, DP, and WM values into a key for a lookup into a configurable congestion clip table, an example of which is shown above in Table 2. The lookup will either 'hit', indicating the packet continues to be forwarded, or 'miss' in which case the packet is discarded or 'clipped'.

Figure 5:
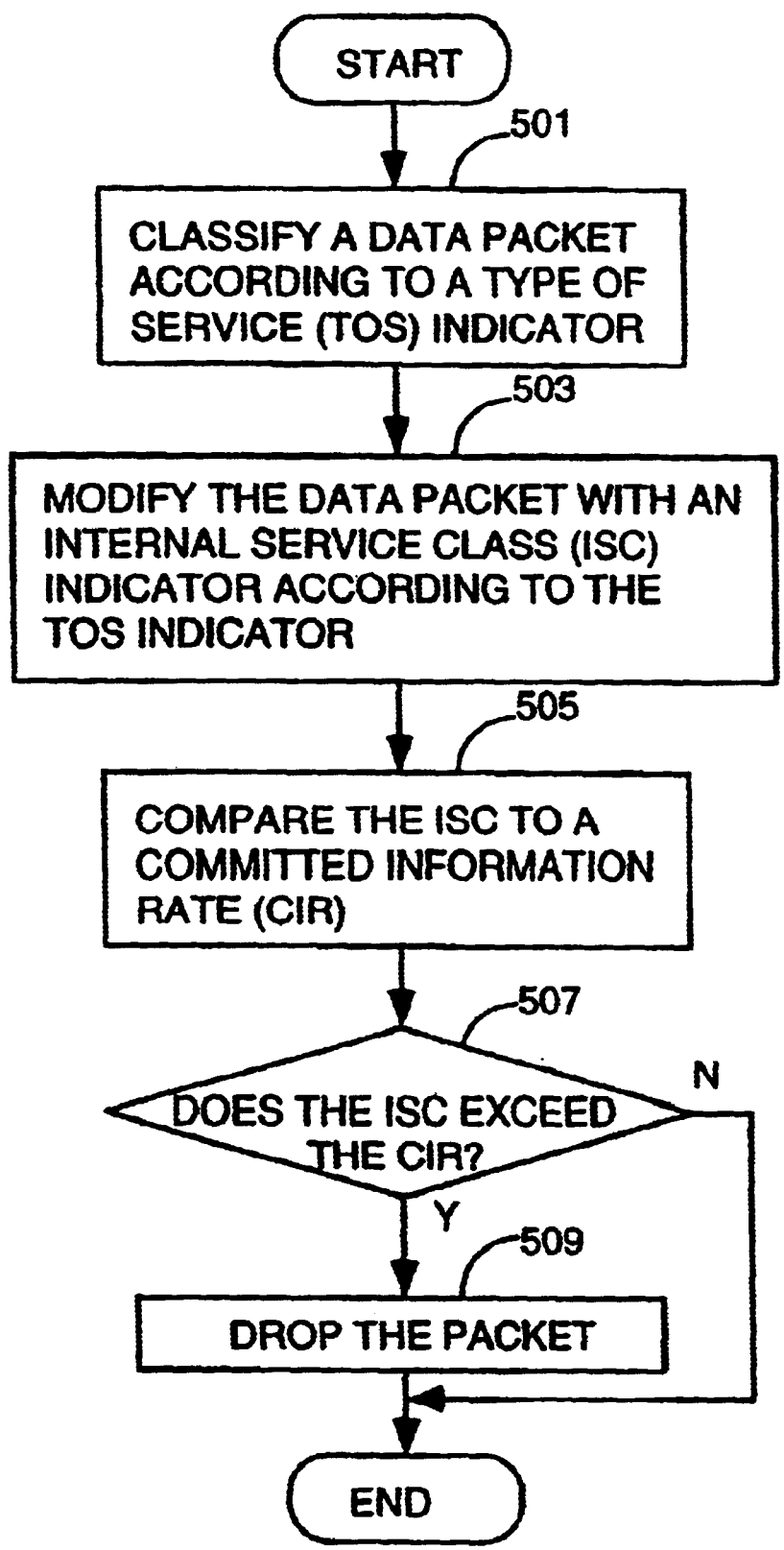
FIG. 5 shows a flow diagram of a method for discarding data packets compatible with the present invention.

FIG. 5 shows an example flow diagram of a method for discarding data packets. At step 501, a data packet is classified according to a TOS indicator. At step 503, the data packet is modified with an ISC indicator according to the TOS indicator. At step 505, the ISC is compared to a CIR. If at step 507 the ISC exceeds the CIR, the data packet is dropped at step 509.

It is desirable that in these congested scenarios that the lesser precedence packets can be dropped at a rate fast enough to allow for higher precedence packets to continue to be forwarded and also to drain the inbound descriptor queues (FIFO A memory 121 and FIFO B memory 123) in order to replenish the free buffer pool 117.

QOS Translation

One embodiment of the disclosed technology supports a configurable mapping function which allows users to specify an encoding used in a network which can then be appropriately decoded and translated while the system is in operation. TOS fields are preferably mapped on a per-interface basis. For an example multi-user environment with equipment from multiple vendors, on ingress, a TOS field and a precedence field are mapped from a first vendor encoding to an internal encoding. On egress, the internal encoding is mapped to a second vendor specific encoding for subsequent transmission.

In one embodiment of the disclosed technology, the IP header of a data packet contains a 8-bit QOS field which provides a definition of the quality of service for that data packet. Typically, the 8-bit QOS field may be divided into a 3-bit precedence segment and a 5-bit TOS segment, but it will be recognized by one of ordinary skill in the art that the size, number, and type of divisions of the QOS field may be modified without loss of generality. A 256 entry lookup table is used to translate the 8-bit QOS field into a 3-bit ISC and a 1-bit drop preference (DP) bit. An example partial receive translation table illustrating an 8-bit QOS to 4-bit ISC translation is given below in Table 3.

TABLE 3

Receive translation table.

| QOS Byte | Mask | ISC | DP |
| --- | --- | --- | --- |
| 00000000 | --11---- | 0 | 0 |
| 00010000 | --11---- | 3 | 0 |
| 00100000 | --11---- | 6 | 1 |
| 00110000 | --11---- | 7 | 1 |

Once internal processing of the data packet is complete, the 4-bit ISC value contained in the data packet header is translated back to an external QOS value. A 256 entry lookup table is used to translate the 4-bit ISC to an 8-bit QOS value. An example partial transmit translation table illustrating a 4-bit ISC to an 8-bit QOS translation is given below in Table 4.

TABLE 4

Transmit translation table.

| ISC | DP | QOS Byte | Mask |
| --- | --- | --- | --- |
| 0 | 0 | 00000000 | --11---- |
| 3 | 0 | 00010000 | --11---- |
| 6 | 1 | 00100000 | --11---- |
| 7 | 1 | 00110000 | --11---- |

In both the receive and transmit translation tables, a mask word is used to isolate significant bits within the TOS or DP segments of the QOS byte. Typically, all non-masked bits are not modified within the header of the data packet. It will be recognized by one of ordinary skill in the art that different mask words other than those shown in Table 3 and Table 4 may be used to isolate different bits within the QOS byte. It will be further recognized that the mask word may be eliminated altogether, and that the QOS byte can simply be used directly for the TOS and DP fields.

Figure 6:
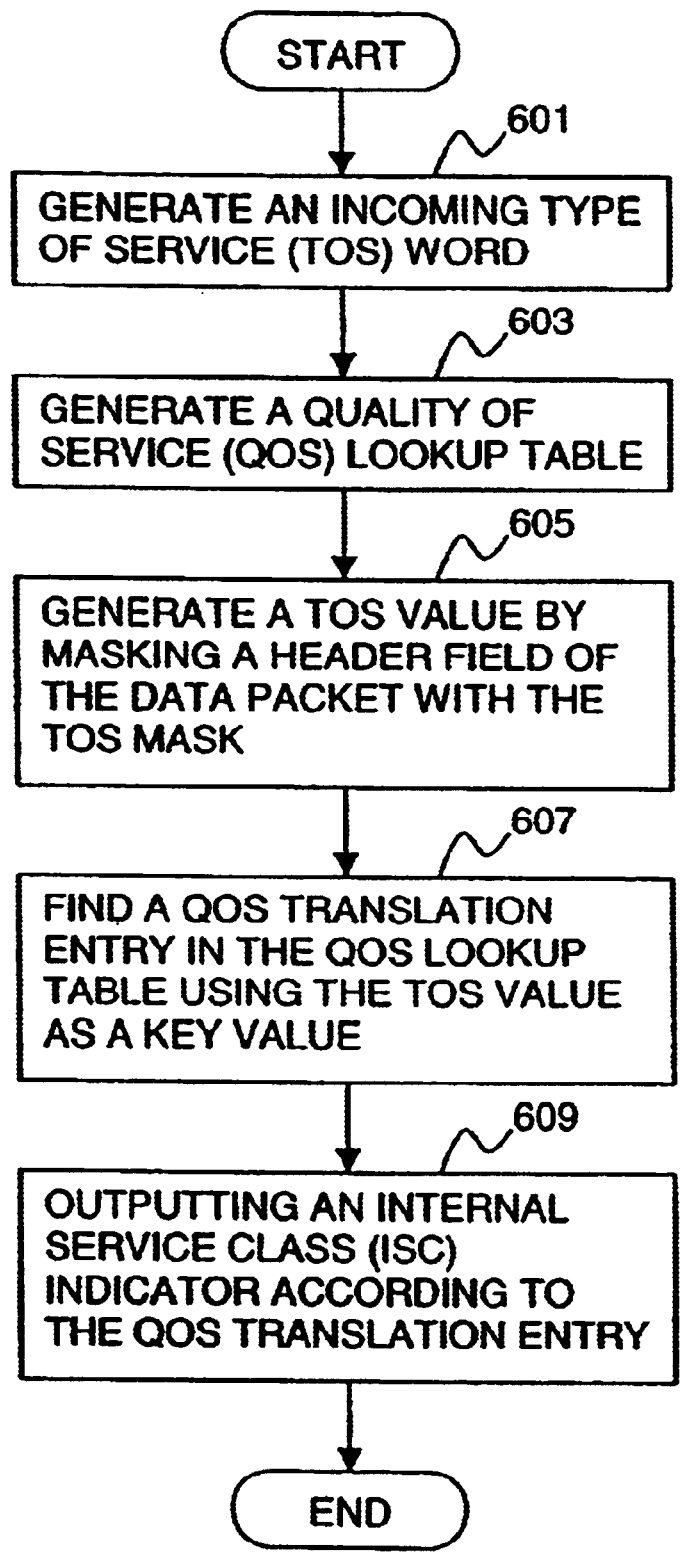
FIG. 6 shows a flow diagram of a method for translating the QOS of a data packet compatible with the present invention.

FIG. 6 shows an example flow diagram of a method for translating the QOS of a data packet. At step 601, an incoming TOS mask word is generated. At step 603, a QOS lookup table is generated. At step 605, a TOS value is generated by masking a header field of the data packet with the TOS mask. At step 607, a QOS translation entry is located in the QOS lookup table using the TOS value as a key value. At step 609, an ISC indicator is output according to the QOS translation entry.

QOS Filtering

One embodiment of the disclosed technology supports QOS traffic management features to allow an ISP to separate mission critical or premium traffic from best-effort traffic, and to tariff these QOS traffic levels at different rates. The disclosed technology provide an approach to classifying and policing data packets when the QOS indicator of the packet is not reliable.

Figure 7:
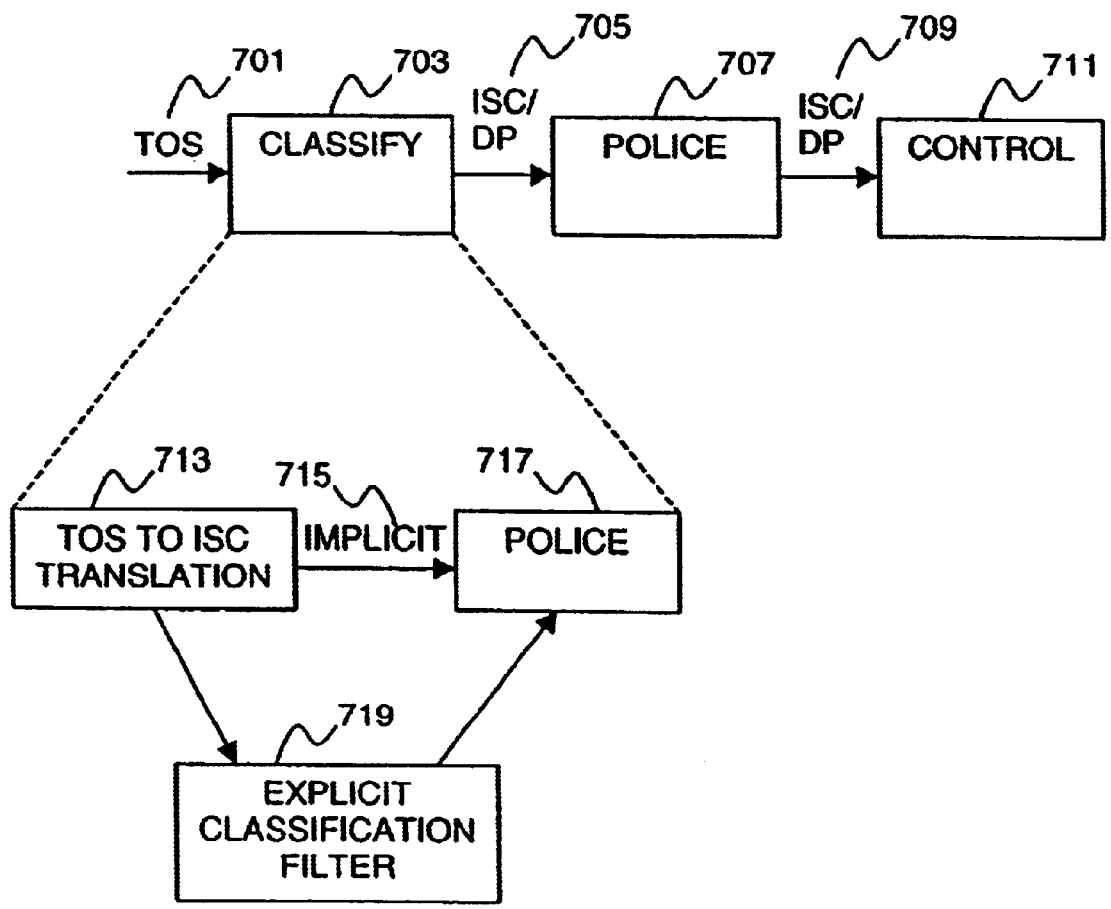
FIG. 7 shows a system diagram of a logical data traffic management structure compatible with the present invention.

FIG. 7 shows an example system diagram of a logical data traffic management structure. The system provides the three key components of classification 703, policing 707, and congestion control (packet discard) 711. An incoming TOS indicator 701 of a data packet is classified at 703 and converted into an ISC/DP value 705. The ISC/DP value 705 is used at 707 to police traffic flow according to the quality of service required for the data packet, which is handled by control module 711.

As described above, one embodiment of the disclosed technology supports classification of traffic into eight service classes. Ingress traffic is preferably classified through one of two methods: implicit classification 715, or explicit classification 719. Implicit classification takes an incoming TOS indicator and translates it directly to an ISC/DP value at 713, where it is subsequently sent to a polcing module 717, or alternatively policing module 707. However, explicit classification preferably takes precedence over implicit classification.

Explicit classification is typically implemented through packet filters. Typical criteria which are used for the filters include, but are not limited to, ingress channel identifier, IP source address or range of source addresses, IP destination address or range of destination addresses, protocol, options field, TOS/precedence field, source/destination ports (UDP or TCP), TCP flags, or any combination of these.

A count is preferably maintained for each match to a filter. Filtered traffic may be either blocked/dropped, or prioritized. The blocking action may be used, for example, to deny access to certain destinations with the ISP network, deny certain types of IP packets from discovering the network topology, deny preferential treatment to certain sources which have set the TOS, deny certain applications from accessing network resources, or deny certain multicast traffic or protocols from entering the network. The counting action may be used to characterize traffic levels by sender, by application, by service class, or by destination. The prioritization action may be used to elevate certain data flows into a higher service class. Service classes are backed by at least two service queues at the system egress. Best-effort and lowest priority classes are mapped onto one queue, while highest priority traffic occupies the other.

The disclosed technology polices data packet transmission by measuring the average bandwidth utilization and marking traffic which exceeds the committed bandwidth as eligible for discarding on a per service class basis. Two levels of policing are implemented: a CIR and a burst rate. Traffic exceeding the CIR is marked as eligible for discard and may optionally have the drop preference bit set in the TOS octet. Traffic which has exceeded the CIR may be reclassified as best-effort. Traffic exceeding the burst rate is immediately discarded. The burst rate ceiling allows the present technology to discard traffic in a service class immediately rather than defer packet discard to congestion control. Policing is typically implemented at the byte level, rather than the packet level, for the finest possible bandwidth control.

Figure 8:
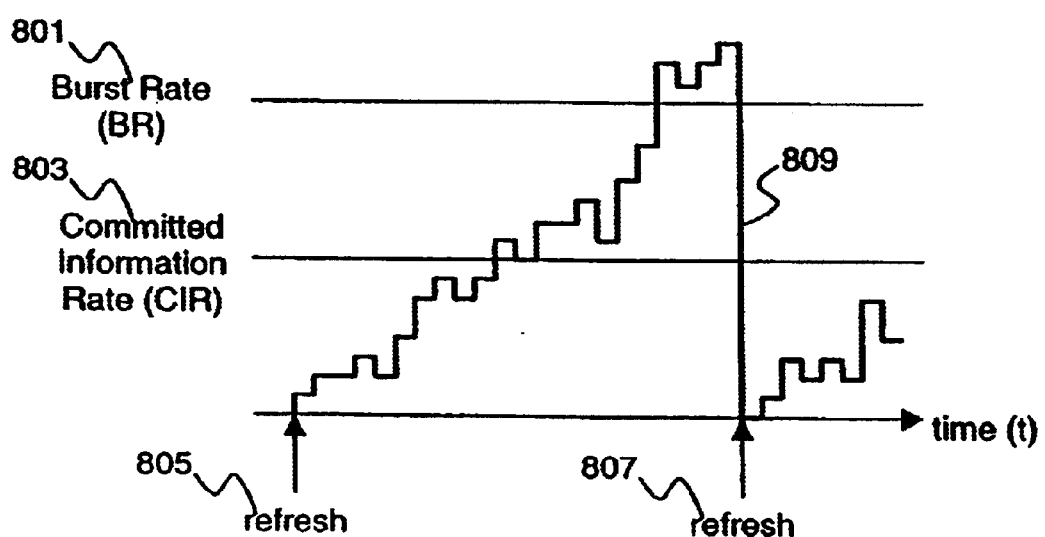
FIG. 8 is a graph of an example data traffic flow over time compatible with the present invention.

FIG. 8 shows an example data traffic flow over time, as described above. A filter count 809 is maintained over time, which is periodically initialed at refresh points 805, 807. Actions may be taken, as described above, if the filter count 809 exceeds either a burst rate 801 or a CIR 803.

Figure 9:
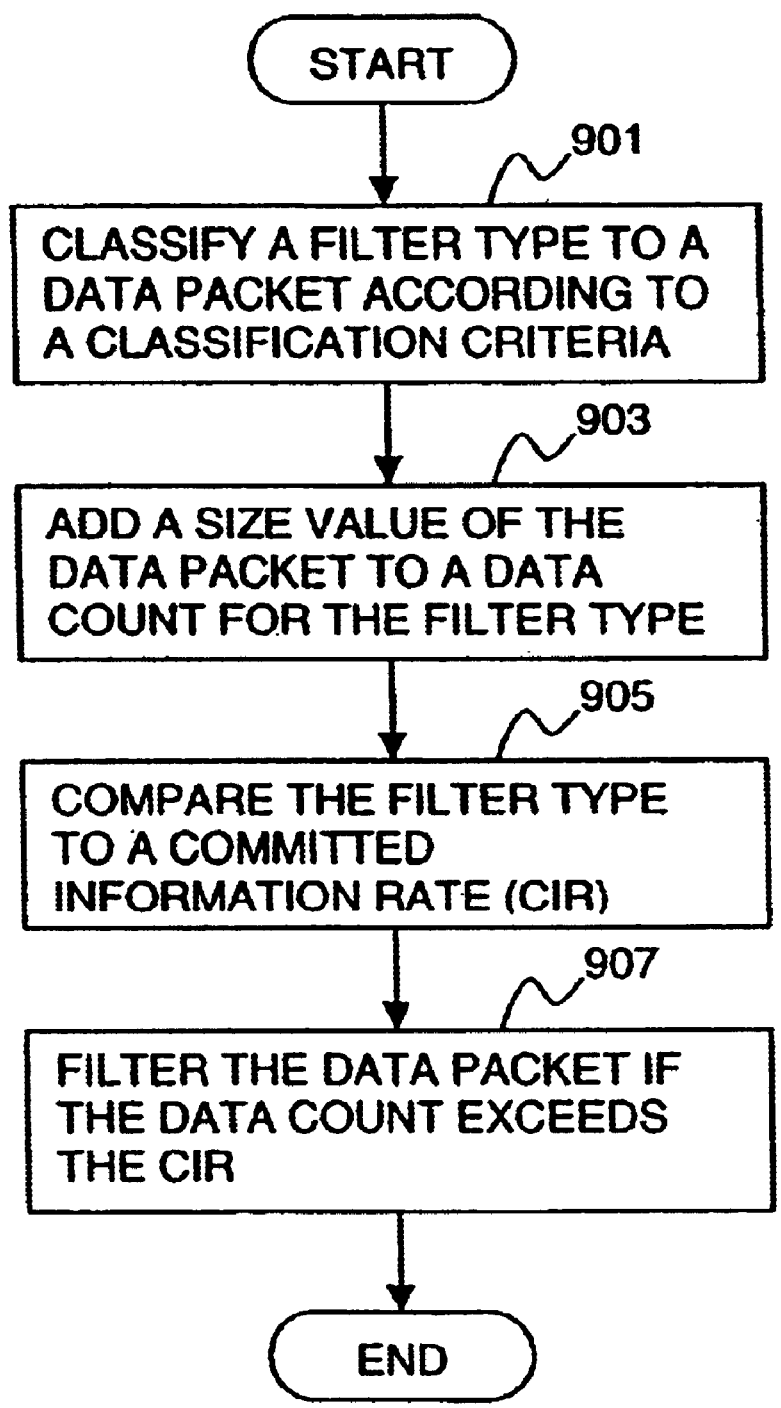
FIG. 9 shows a method for filtering a data packet compatible with the present invention.

FIG. 9 shows an example flow diagram of a method for filtering a data packet. At step 901, a filter type to the data packet is classified according to a classification criteria. At step 903, a size value of the data packet is added to a data count for the filter type. At step 905, the filter type is compared to a CIR. At step 907, the data packet is filtered if the data count exceeds the CIR.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method for filtering a data packet comprising the steps of:

classifying an internal service class (ISC) to the data packet according to a classification criteria selected from the group comprising at least two of an ingress channel identifier, an IP source address, an IP destination address, a protocol, an options field, a type of service (TOS)/precedence field, source ports, destination ports, and TCP flags;

adding a size value of the data packet to a data count for the ISC;

comparing the ISC to a committed information rate (CIR);

setting a drop preference bit (DP) for the data packet if the data count exceeds the CIR;

setting a watermark indicator (WM) for the data packet responsive to a congestion level of a buffer memory;

concatenating the ISC, DP, and WM into a key for a lookup into a configurable congestion clip table; and discarding the data packet responsive to the lookup into the configurable congestion clip table.

2. The method of claim 1 further comprising discarding the data packet if the data count exceeds a burst rate being greater than the CIR.

3. The method of claim 1 further comprising altering the ISC of the data packet if the data count exceeds the CIR.

4. A method for filtering a data packet comprising the steps of:

classifying an internal service class (ISC) selected from the group comprising a sender, an application, a service class, and a destination;

adding a size value of the data packet to a data count for the ISC;

comparing the ISC to a committed information rate (CIR);

setting a drop preference bit (DP) for the data packet if the data count exceeds the CIR;

setting a watermark indicator (WM) for the data packet responsive to a congestion level of a buffer memory;

concatenating the ISC, DP, and WM into a key for a lookup into a configurable congestion clip table; and discarding the data packet responsive to the lookup into the configurable congestion table.

5. The method of claim 4 further comprising discarding the data packet if the data count exceeds a burst rate being greater than the CIR.

6. The method of claim 4 further comprising altering the ISC of the data packet if the data count exceeds the CIR.

7. A method for filtering a data packet comprising:

classifying an internal service class (ISC) to the data packet according to a classification criteria;

adding a size value of the data packet to a data count for the ISC;

comparing the ISC to a committed information rate (CIR);

setting a drop preference bit (DP) for the data packet if the data count exceeds the CIR;

setting a watermark indicator (WM) for the data packet responsive to a congestion level of a buffer memory;

concatenating the ISC, DP, and WM into a key for a lookup into a configurable congestion clip table;

discarding the data packet responsive to the lookup into the configurable congestion clip table; and initializing the data count at a time interval.

8. An apparatus for filtering a data packet comprising:

a classifier to classify an internal service class (ISC) to the data packet according to a classification criteria selected from the group comprising an ingress channel identifier, an IP source address, an IP destination address, a protocol, an options field, a TOS/precedence field, source ports, destination ports, and TCP flags;

an adder logically coupled to the classifier to add a size value of the data packet to a data count for the ISC;

a comparator logically coupled to the adder to compare the ISC to a CIR;

a drop flagger logically coupled to the comparator to set a drop preference bit (DP) for the packet if the data count exceeds the CIR;

a watermaker logically coupled to a buffer memory to set a watermark indicator (WM) for the data packet responsive to a congestion level of the buffer memory;

a table lookup unit logically coupled to a configurable congestion clip table to concatenate the ISC, DP, and WM into a key and to lookup the key in the congestion clip table; and a filter logically coupled to the table lookup unit to discard the data packet responsive to the lookup into the configurable congestion clip table.

9. The apparatus of claim 8 wherein the filter is further to discard the data packet if the data count exceeds a burst rate.

10. The apparatus of claim 8 further comprising a reclassifier to reclassify the ISC of the data packet if the data count exceeds the CIR.

11. An apparatus for filtering a data packet comprising:

a classifier to classify an internal service class (ISC) selected from the group comprising a sender, an application, a service class, and a destination;

an adder logically coupled to the classifier to add a size value of the data packet to a data count for the ISC;

a comparator logically coupled to the adder to compare the ISC to a CIR;

a drop flagger logically coupled to the comparator to set a drop preference bit (DP) for the packet if the data count exceeds the CIR;

a watermaker logically coupled to a buffer memory to set a watermark indicator (WM) for the data packet responsive to a congestion level of the buffer memory;

a table lookup unit logically coupled to the data packet to concatenate the ISC, DP, and WM into a key and to lookup the key in a configurable congestion clip table; and a filter logically coupled to the table lookup unit to discard the data packet responsive to the lookup into the configurable congestion clip table.

12. The apparatus of claim 11 wherein the filter is further to discard the data packet if the data count exceeds a burst rate.

13. The apparatus of claim 11 further comprising a reclassifier to reclassify the ISC of the data packet if the data count exceeds the CIR.

14. An apparatus comprising:

a classifier to classify an internal service class (ISC) to the data packet according to a classification criteria;

an adder logically coupled to the classifier to add a size value of the data packet to a data count for the ISC;

a comparator logically coupled to the adder to compare the ISC to a CIR;

a drop flagger logically coupled to the comparator to set a drop preference bit (DP) for the packet if the data count exceeds the CIR;

a watermaker logically coupled to a buffer memory to set a watermark indicator (WM) for the data packet responsive to a congestion level of the buffer memory;

a table lookup unit logically coupled to a configurable congestion clip table to concatenate the ISC, DP, and WM into a key and to lookup the key in the congestion clip table;

a filter logically coupled to the table lookup unit to discard the data packet responsive to the lookup into the configurable congestion clip table; and an initalizer logically coupled to the adder to initalize the data count at a time interval.

15. An article of manufacture for use in a computer system to filter a data packet, the article of manufacture comprising:

computer usable medium having computer readable program code means embodied in the medium, the program code means including:

computer readable program code means embodied in the computer usable medium for causing a computer to initialize the data count at a time interval;

computer readable program code means embodied in the computer usable medium for causing a computer to classify an internal service class (ISC) to the data packet according to a classification criteria;

computer readable program code means embodied in the computer usable medium for causing a computer to add a size value of the data packet to a data count for the ISC;

computer readable program code means embodied in the computer usable medium for causing a computer to compare the ISC to a CIR;

computer readable program code means embodied in the computer usable medium for causing a computer to set a drop preference bit (DP) for the data packet if the data count exceeds the CIR;

computer readable program code means embodied in the computer usable medium for causing a computer to set a watermark indicator (WM) for the data packet responsive to a congestion level of the buffer memory;

computer readable program code means embodied in the computer usable medium for causing a computer to concatenate the ISC, DP, and WM into a key and to lookup the key in a configurable congestion clip table; and computer readable program code means embodied in the computer useable medium for causing a computer to discard the data packet responsive to the lookup into the configurable congestion clip table.

16. The article of manufacture of claim 15 wherein the computer readable program code means embodied in the computer usable medium for causing the computer to classify the ISC to the data packet according to the classification criteria comprises classifying the ISC to the data packet according to a classification criteria selected from the group comprising ingress channel identifier, IP source address, IP destination address, protocol, options field, TOS/precedence field, source ports, destination ports, and TCP flags.

17. The article of manufacture of claim 15 wherein the computer readable program code means embodied in the computer usable medium for causing the computer to classify the ISC to the data packet according to a classification criteria comprises classifying the ISC selected from the group comprising sender, application, service class, and destination.

18. The article of manufacture of claim 15 wherein the computer readable program code means embodied in the computer usable medium for causing the computer to discard the data packet responsive to the lookup into the configurable congestion clip table is further causing the computer to discard the data packet if the data count exceeds a burst rate.

19. The article of manufacture of claim 15 wherein the computer readable program code means embodied in the computer usable medium further comprises computer readable program code means embodied in the computer usable medium for causing a computer to reclassify the ISC of the data packet if the data count exceeds the CIR.

* * * * *